(12) United States Patent
Martinez et al.

(10) Patent No.: US 8,777,333 B2
(45) Date of Patent: Jul. 15, 2014

(54) BRAKE FORCE GENERATOR FOR A MOTOR VEHICLE BRAKE SYSTEM HAVING A SUPPORT DEVICE FOR A RESETTING SPRING

(75) Inventors: José Manuel Calvo Martinez, Kruft (DE); Kurt Wingender, Hartenfels (DE); Grzegorz Knapik, Tarnowskie Gory (PL)

(73) Assignees: Lucas Automotive GmbH, Koblenz (DE); TRW Braking Systems Polska SP.Z.O.O., Gliwice (PL)

( * ) Notice: Subject to any disclaimer, the term of this patent is extended or adjusted under 35 U.S.C. 154(b) by 406 days.

(21) Appl. No.: 13/056,196

(22) PCT Filed: Jul. 27, 2009

(86) PCT No.: PCT/EP2009/005429
§ 371 (c)(1),
(2), (4) Date: Mar. 23, 2011

(87) PCT Pub. No.: WO2010/012440
PCT Pub. Date: Feb. 4, 2010

(65) Prior Publication Data
US 2011/0162922 A1 Jul. 7, 2011

(30) Foreign Application Priority Data
Jul. 29, 2008 (DE) .......................... 10 2008 035 179

(51) Int. Cl.
*B60T 8/44* (2006.01)

(52) U.S. Cl.
USPC ....................................... 303/114.3; 188/356

(58) Field of Classification Search
CPC ....... B60T 13/57; B60T 13/72; B60T 13/563; B60T 13/565; B60T 13/567; B60T 8/4854

USPC ................. 303/114.3, 113.3, 115.3; 188/356; 91/376 R, 369.2

See application file for complete search history.

(56) References Cited

U.S. PATENT DOCUMENTS 5,890,775 A 4/1999 Tsubouchi et al.
6,112,637 A * 9/2000 Tsubouchi et al. ............. 91/173

(Continued)

FOREIGN PATENT DOCUMENTS

DE 19635016 A1 3/1997
DE 19802846 A1 8/1999

(Continued)

*Primary Examiner* — Xuan Lan Nguyen
(74) *Attorney, Agent, or Firm* — MacMillan, Sobanski & Todd, LLC

(57) ABSTRACT

A brake force generator for a motor vehicle brake system, comprises a displaceable force input element connected or connectable to a brake pedal, a control valve actuable in accordance with a displacement of the force input element, a chamber arrangement disposed in a booster housing and controllable by the control valve and comprises at least one vacuum chamber and at least one working chamber, which are separated from one another by at least one movable wall connected to the control valve, and a force output element for supplying a brake force to a downstream brake system, wherein the control valve with the force output element is biased by a resetting spring into a normal position, wherein the resetting spring is supported by its one end against the control valve. In this brake force generator, for improving the assembly properties it is provided that a support ring is provided, against which the resetting spring is supported by its other end, wherein the support ring may be brought into supportive interaction with the booster housing.

7 Claims, 3 Drawing Sheets

(56) References Cited

U.S. PATENT DOCUMENTS 6,213,569 B1 4/2001 Tsubouchi
6,302,011 B1 10/2001 Horner
7,032,496 B2 4/2006 Schramm et al.

FOREIGN PATENT DOCUMENTS

DE 10244002 A1 4/2004
EP 1422116 A1 5/2004

* cited by examiner

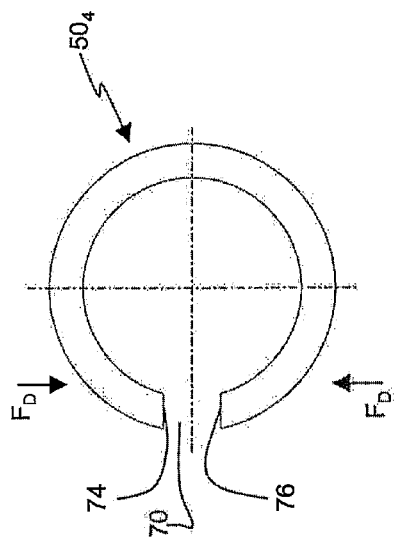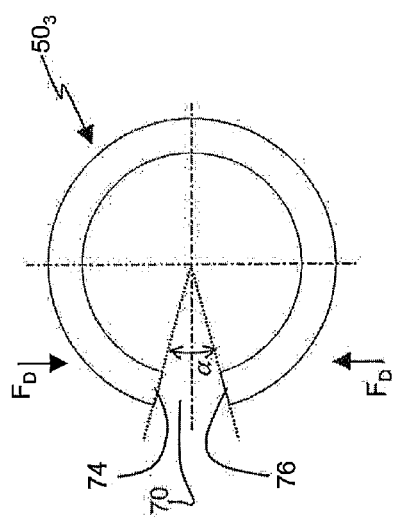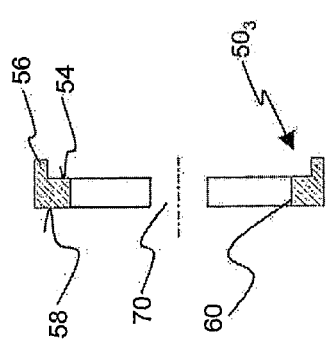
Fig. 5a Fig. 5b Fig. 5c
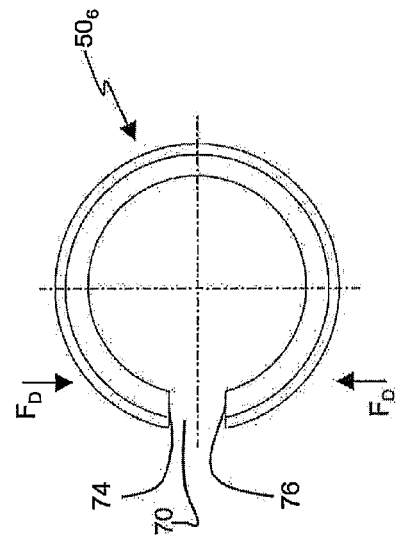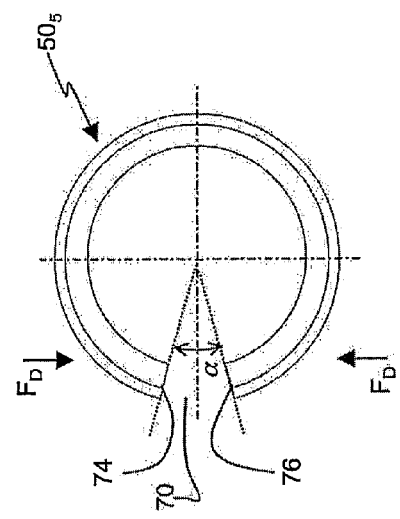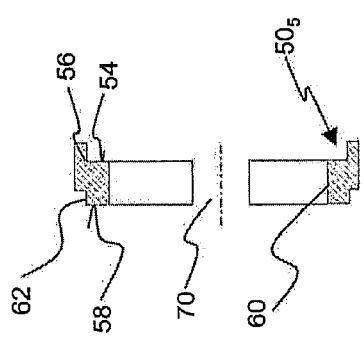
Fig. 6a Fig. 6b Fig. 6c

BRAKE FORCE GENERATOR FOR A MOTOR VEHICLE BRAKE SYSTEM HAVING A SUPPORT DEVICE FOR A RESETTING SPRING

CROSS-REFERENCE TO RELATED APPLICATIONS

This application is a national stage of International Application No. PCT/EP2009/005429 filed Jul. 27, 2009, the disclosures of which are incorporated herein by reference in entirety, and which claimed priority to German Patent Application No. 10 2008 035 179.2 filed Jul. 29, 2008, the disclosures of which are incorporated herein by reference in entirety.

BACKGROUND OF THE INVENTION

The present invention relates to a brake force generator for a motor vehicle brake system, comprising a displaceable force input element connected or connectable to a brake pedal, a control valve actuable in accordance with a displacement of the force input element, a chamber arrangement disposed in a booster housing and controllable by means of the control valve and comprising at least one vacuum chamber and at least one working chamber, which are separated from one another by at least one movable wall connected to the control valve, and a force output element for supplying a brake force to a downstream brake system, wherein the control valve with the force output element is biased by a resetting spring into a normal position, wherein the resetting spring is supported by its one end against the control valve.

Such a brake force generator is prior art. Thus, the document EP 1 422 116 B1 discloses a brake force generator of this type. In this brake force generator a resetting spring arrangement comprising two resetting springs is provided, which is supported by its one end against a control valve housing of the control valve. By its other end the resetting spring is supported against a master cylinder arrangement. As a result, on the one hand the master cylinder arrangement is biased into a normal position and on the other hand the control valve housing and the movable wall coupled thereto are biased into their normal position. Experience has shown however that during the assembly of such brake force generators, in particular prior to mounting of the brake force generator on the downstream master cylinder arrangement, one of the resetting springs or the entire resetting spring arrangement may fall out of the brake force generator or may become skewed. As a consequence of this, the resetting springs have to be retro-fitted, this on the one hand increasing the assembly outlay and on the other hand being susceptible to faults, for example because the springs are fitted the wrong way round or suffer damage when they fall out.

BRIEF SUMMARY OF THE INVENTION

Against this background a feature of the present invention is to provide a brake force generator of the initially described type, which, given the same functionality and simple construction, prevents the resetting springs from accidentally falling out.

This feature is achieved by a brake force generator of the initially described type, in which it is provided that a support ring is provided, against which the resetting spring or resetting spring arrangement is supported by its other end, wherein the support ring may be brought into supportive interaction with the booster housing.

According to the invention, therefore, a support ring is provided, which before and during assembly holds the resetting spring in a setpoint position and hence prevents the resetting spring from accidentally falling out of the brake force generator prior to the mounting of the master cylinder arrangement or some other component of the brake system disposed downstream of the brake force generator.

The invention accordingly provides that by means of a simple additional component, which in no way alters the function of the brake force generator but considerably improves the reliability of assembly thereof, the susceptibility to faults described in the introduction with reference to the prior art is eliminated before and during assembly.

When in connection with the description of the present invention the term "brake force generator" is used, this term on the one hand includes a conventional vacuum brake booster, which following an actuation of the control valve via a brake-pedal-actuated force input element supplies the downstream brake system with an actuating force that is boosted in a conventional manner by a pressure difference at the movable wall of the chamber arrangement. The term "brake force generator" however also includes devices fitted in modern brake systems, whereby the brake force is generated synthetically. In such brake force generators there is extensive or complete dissipation of the actuating force generated at the brake pedal. The actuating force transmitted to the downstream brake system is generated in such systems synthetically in accordance with the pedal actuation or in accordance with other factors, such as for example an output signal of a drive assist system or the like.

A development of the present invention provides that the booster housing has a collar, against which the support ring is positionable. Such a collar may be configured for example in the form of a tubular portion, which is integrally formed or retro-fitted on the booster housing and extends into the chamber arrangement. Other types of structure, by means of which the support ring may be brought into supportive interaction, are however equally conceivable.

According to the invention, in this connection it may further be provided that the support ring is positionable with an end-face abutment surface against the collar of the booster housing. Alternatively it may be provided that the support ring has an end-face abutment shoulder, with which it is positionable positively against the collar of the booster housing. In the case of the option last mentioned, the support ring is held positively in a setpoint position relative to the booster housing, in particular relative to the collar thereof.

According to the invention it may further be provided that the support ring at its side remote from the booster housing has a circumferential attachment, in which the end of the resetting spring is accommodated in a positioning manner. It is thereby possible to position the resetting spring in a setpoint position relative to the support ring in order to prevent an undesirable displacement of the resetting spring relative to the support ring.

According to the invention it may further be provided that the support ring has a central hole, through which the force output element or a transmission element connected thereto extends for transmitting the brake force to the downstream brake system. The hole has to be large enough to enable a transmission of the output force to the downstream brake system, for example to the master cylinder. Naturally, the support ring should be stable enough to be able to guarantee its positioning- and supportive effect.

The support ring is preferably manufactured from a plastics material. It may however alternatively be manufactured from a different type of material, for example from a light metal, such as aluminium or the like.

According to the invention it may further be provided that the support ring only prior to mounting of the brake force generator onto the downstream brake system is in interaction with the booster housing and after mounting of the brake force generator onto the downstream brake system is lifted off the booster housing. The support ring is therefore to be regarded as merely a positioning- and assembly aid, wherein it prevents the spring from sliding out of the booster housing and holds the resetting spring in an advantageous setpoint position for easy assembly prior to mounting of the brake force generator onto the downstream brake system, for example the master cylinder. After the mounting, the support ring in this constructional variant is lifted off the booster housing and throughout operation no longer comes into abutment with the booster housing. It is only in the event of disassembly, for example in the situation of maintenance or exchange in the workshop, that the support ring comes back into abutment with the booster housing and hence holds the resetting spring in the setpoint position thereof.

According to a development of the invention it may be provided that the support ring is slotted at a peripheral point. By virtue of a slotted construction of the support ring it is possible during assembly for the support ring to be compressed and reduced in diameter and hence be easier to introduce into the booster housing and mount on the collar of the booster housing. After being released, the support ring owing to its elastic properties springs back into its original state and is therefore held fast on the collar. In this regard it may be provided that the end faces of the support ring that are produced by the slotting extend parallel to one another or include an angle of less than 180°.

The invention is described below by way of example with reference to the accompanying figures and other advantages of this invention will become apparent to those skilled in the art from the following detailed description of the preferred embodiments, when read in light of the accompanying drawings.

BRIEF DESCRIPTION OF THE DRAWINGS

FIG. 5a-5c is the support ring according to FIG. 2 in a slotted construction, wherein FIGS. 5b and 5c show different types of slotting; and FIG. 6a-6c is the support ring according to FIG. 3 in a slotted construction, wherein FIGS. 6b and 6c show different types of slotting;

DETAILED DESCRIPTION OF THE INVENTION

Figure 1:
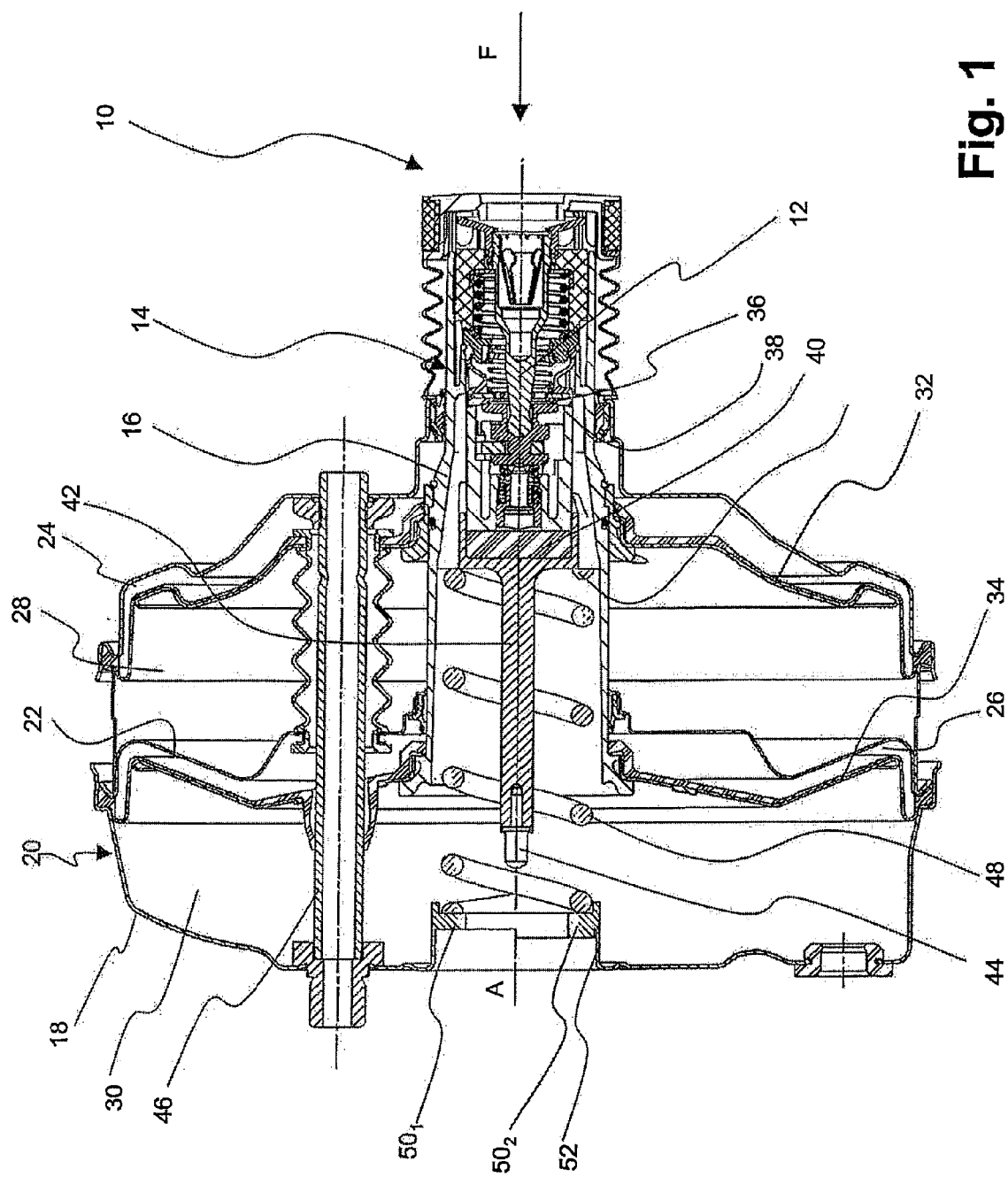
FIG. 1 is an axis-containing sectional view of a brake force generator according to the invention with two support ring variants in cross section.

In FIG. 1 a brake force generator according to the invention is shown in an axis-containing sectional view and is generally denoted by 10. The brake force generator comprises a force input element 12, which may be loaded via a brake pedal with a force F and displaced in FIG. 1 to the left along a longitudinal axis A. Connected to the force input element 12 is an, as such, conventionally designed control valve 14, the control valve housing 16 of which is displaceable relative to a booster housing 18. Situated in the booster housing 18 is a tandem chamber arrangement 20, which is divided into two parts by means of a wall 22 installed in a fixed manner in the booster housing 18. Each part comprises a working chamber 24 and/or 26 and a vacuum chamber 28, 30. The working chamber 24 is separated from the vacuum chamber 28 by a movable wall 32. The working chamber 26 is separated from the vacuum chamber 30 by a further movable wall 34.

Both movable walls 32, 34 are connected to the control valve housing 16 in a fixed manner for joint motion. In the control valve 14 two valve seats 36, 38 are disposed, wherein the first valve seat 36 separates the working chambers 24 and 26 from the ambient atmosphere and wherein the second valve seat 38 separates the working chambers 24 and 26 from the vacuum chambers 28 and 30.

The control valve housing 16 is connected by a rubber-elastic reaction element 40 to a force output element 42. The force output element on its, in FIG. 1 left, end has a pin-like projection 44, by which it may be workingly connected to a downstream component of a motor vehicle brake system, for example to a master cylinder arrangement. The booster housing 18 is penetrated by tie bolts 46, by means of which the brake force generator 10 may be mounted on a splashboard.

FIG. 1 further shows a resetting spring 48, which is supported at one end against the booster housing 16. The resetting spring 48 is supported by its other end against a support ring, which in FIG. 1 is shown in two different constructions $50_1$ and $50_2$. The support ring $50_1$ and/or $50_2$ is in turn supported against a collar 52, which extends in a tubular manner in axial direction into the booster housing 18.

The brake force generator according to FIG. 1 functions in an, as such, conventional manner. In other words, upon an actuation of the non-illustrated brake pedal a force F is exerted on the force input element 12, so that the force input element 12 is displaced in FIG. 1 to the left in axial direction A. The first sealing seat 36 is therefore opened, thereby leading to a build-up of a pressure difference at the movable walls 32 and 34. These cause the booster housing 16 to be displaced in FIG. 1 to the left until the first sealing seat 36 closes again. The actuating force F that is transmitted via the force output element 42 to the downstream brake system is therefore boosted by the boosting effect resulting from the pressure difference at the movable walls 32 and 34. Upon release of the brake pedal, the previously described operations run off in reverse order, thereby leading to a relief of pressure at the movable walls 32 and 34, until the brake force generator 10 returns to its normal position shown in FIG. 1.

As already mentioned, the brake force generator 10 is shown in FIG. 1 in a pre-assembly position, i.e. in a position, in which the brake force generator 10 has not yet been connected to a master cylinder. In this state the support ring $50_1$ and/or $50_2$ rests against the collar 52 of the booster housing 18. This prevents the resetting spring 48 from being able to slide out of the booster housing 18. Rather, the support ring $50_1$ and/or $50_2$ holds the resetting spring 48 in a setpoint position that considerably facilitates assembly.

Figures 2, 3, 4:
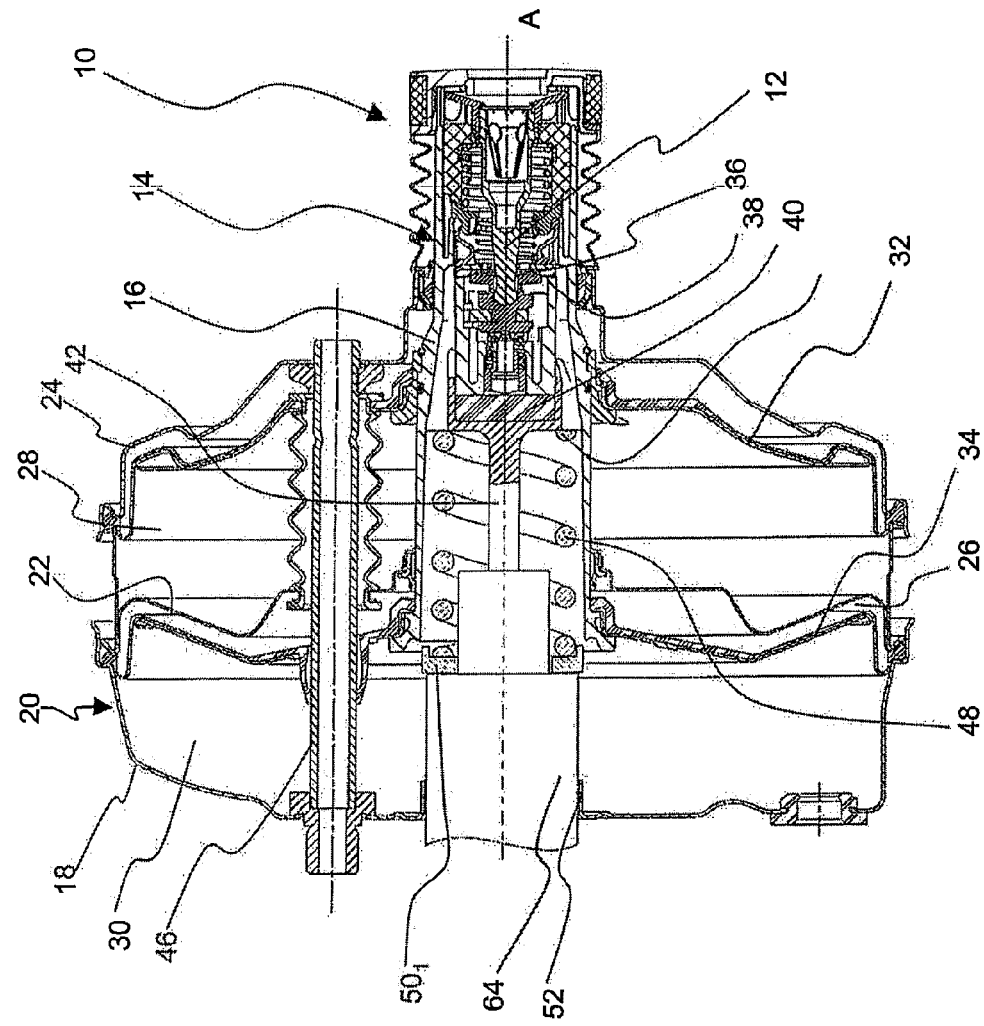
FIG. 2 is the first support ring variant in cross section in a component representation.
FIG. 3 is a second support ring variant in a view corresponding to FIG. 2.
FIG. 4 is a view of the brake force generator corresponding to FIG. 1, but after mounting and in operation.

FIGS. 2 and 3 show the support rings $50_1$ and $50_2$ in a component representation. The support ring $50_1$ according to FIG. 2 has an abutment surface 54, against which the left end of the resetting spring 48 may be supported. This abutment surface 54 is surrounded by a circumferential annular attachment 56. This attachment 56 positions the resetting spring and holds it in the setpoint position, thereby preventing the resetting spring from sliding orthogonally to the longitudinal axis A (see FIG. 1). At its side remote from the abutment surface 54 the support ring $50_1$ has on its end face a further abutment surface 58. With this abutment surface 58 the support ring 50₁ rests and is supported against the booster-housing-side collar. Finally, the support ring 50₁ additionally has a central hole 60, through which the force output element 42 and/or a component of the downstream brake system may extend.

FIG. 3 shows a modified form of construction of the support ring according to FIG. 2, wherein this support ring is provided with the reference character 50₂. The sole difference between the support ring according to FIG. 2 and the support ring according to FIG. 3 is that the support ring 50₂ according to FIG. 3, apart from being of slightly different dimensions, additionally has a circumferential shoulder portion 62, with which it engages positively with, and is therefore supported positively against, the booster-housing-side collar 52 in order to prevent unintentional slipping.

FIG. 4 shows the brake force generator 10 according to the invention in mounted position, wherein a transmission piston 64 has been introduced into the booster housing 18 and is guided in the collar 52. It is evident that the piston 64 is of a stepped construction and receives in it the left end of the force output element 42. It is further evident that the support ring 50₁ is lifted off the booster-housing-side collar 52, wherein the end face thereof remote from the resetting spring is positioned against the piston 64. In other words, the resetting spring 48 is supported by its in FIG. 4 left end via the support ring 50₁ against the piston 64. In the mounted position according to FIG. 4 the support ring 50₁, apart from a supportive and positioning effect for the resetting spring 48 via its radially outer annular attachment 56, is of no further importance. If, however, for the purpose of maintenance or exchange the brake force generator 10 is detached again from the piston 64, the resetting spring 48 may be relieved of tension until the support ring 50₁ is positioned once more against the collar 52 and then holds the resetting spring 48 in its pre-positioned position.

FIGS. 5a to 5c show the support ring of FIG. 2, however in a slotted construction. In particular, as is shown in FIGS. 5b and 5c, this support ring 50₃ and/or 50₄ is provided at a peripheral point with a slot 70 and/or 72. This allows the support ring 50₃ and/or 50₄ to be elastically compressed, as represented by the arrows $F_D$, and hence reduced in size for assembly. After release of the support ring 50₃ and/or 50₄, it relaxes back into its original shape. This considerably facilitates assembly in the booster housing 18. It is evident from FIG. 5b that the end faces 74 and 76 of the support ring 50₃ include an acute angle α, which in the illustrated embodiment is ca. 30°. The embodiment according to FIG. 5c differs in this respect in that the two end faces 74 and 76 of the support ring 50₄ extend substantially parallel to one another.

The forms of construction of the support ring 50₅ and/or 50₆ according to FIGS. 6a to 6c correspond to the support ring 50₂ according to FIG. 3 with shoulder portion 62, only once again in slotted form. With regard to the slotting, the same explanations as were provided with regard to FIGS. 5a to 5c apply.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Brake force generator for a motor vehicle brake system comprising:
a displaceable force input element connected or connectable to a brake pedal,
a control valve actuable in accordance with a displacement of the force input element,
a chamber arrangement disposed in a booster housing and controllable by means of the control valve and comprising at least one vacuum chamber and at least one working chamber, which are separated from one another by at least one movable wall connected to the control valve, and
a force output element for supplying a brake force to a downstream brake system,
wherein the control valve with the force output element is biased by a resetting spring into a normal position, wherein the resetting spring is supported by one end thereof against the control valve,
wherein a support ring is provided, against which the resetting spring is supported by another end thereof, wherein the support ring is configured to be brought into supportive interaction with the booster housing,
wherein the booster housing has a collar, against which the support ring is configured to be positionable thereagainst with an end-face abutment surface thereof being in direct contact with the collar,
wherein the collar includes an opening defining an inner diameter and the resetting spring includes an outer diameter which is less than the inner diameter of the opening of the collar, and
wherein the support ring is configured to be brought into the supportive interaction with the booster housing only prior to the mounting of the brake force generator onto the downstream brake system to thereby prevent the resetting spring from sliding out through the opening in the collar of the booster housing and is configured to be lifted off of the booster housing after mounting of the brake force generator onto the downstream brake system.

2. Brake force generator according to claim 1, wherein the support ring has an end-face abutment shoulder, with which it is positionable positively against the collar of the booster housing.

3. Brake force generator according to claim 1, wherein the support ring at a side remote from the booster housing has a circumferential attachment, in which the end of the resetting spring is accommodated in a positioning manner.

4. Brake force generator according to claim 1, wherein the support ring has a central hole, through which the force output element or a transmission element connected thereto extends for transmitting the brake force to the downstream brake system.

5. Brake force generator according to claim 1, wherein the support ring is slotted at a peripheral point.

6. Brake force generator according to claim 5, wherein end faces of the support ring that are produced by the slotting extend parallel to one another.

7. Brake force generator according to claim 5, wherein end faces of the support ring that are produced by the slotting include an angle of less than 180 degrees.

* * * * *